United States Patent [19]
Rogerson

[11] 3,888,219
[45] June 10, 1975

[54] THROTTLE LINKAGE INCLUDING AN OVERSPEED PROTECTIVE DEVICE

[75] Inventor: Jerry B. Rogerson, Dearborn, Mich.

[73] Assignee: Ford Motor Company, Dearborn, Mich.

[22] Filed: June 10, 1974

[21] Appl. No.: 478,020

[52] U.S. Cl.............. 123/97 R; 74/513; 123/198 D
[51] Int. Cl............................................ F02d 11/04
[58] Field of Search.......... 123/97 R, 103 E, 198 D; 74/513

[56] References Cited
UNITED STATES PATENTS

| | | | |
|---|---|---|---|
| 2,361,206 | 10/1944 | Hoppe | 123/103 E |
| 3,273,552 | 9/1966 | Plath | 74/513 |
| 3,757,603 | 9/1973 | Cattin et al. | 74/513 |

Primary Examiner—Charles J. Myhre
Assistant Examiner—William C. Anderson
Attorney, Agent, or Firm—Roger E. Erickson; Keith L. Zerschling

[57] ABSTRACT

A throttle linkage including an overspeed protection device suitable for selectively limiting the speed of a high revving engine in a motor vehicle. The device is part of the accelerator linkage and utilizes a spring loaded pulley over which a throttle actuating cable is positioned. When a predetermined cable tension is reached, the pulley is displaced and the linkage lengthens thereby precluding further output displacement of the linkage and the throttle lever.

13 Claims, 1 Drawing Figure

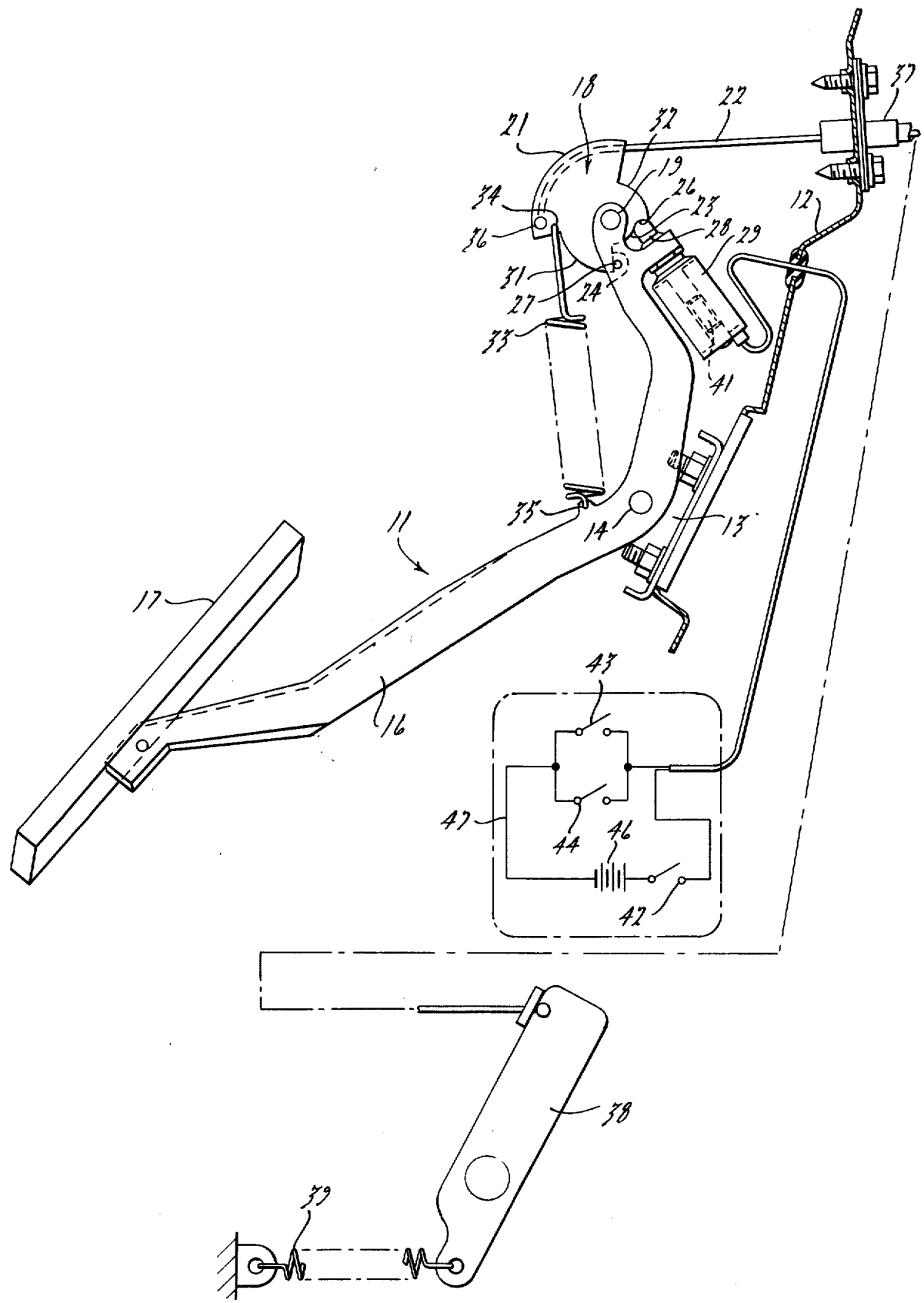

THROTTLE LINKAGE INCLUDING AN OVERSPEED PROTECTIVE DEVICE

BACKGROUND AND SUMMARY OF THE INVENTION

Overspeed protection is desirable in vehicles having high revving engines, such as rotary or turbine engines, to prevent possible damage to the transmission in neutral or park or when the automatic transmission is placed from neutral into a forward or reverse gear. This invention provides a throttle linkage which can operate either in the conventional manner or as a means to limit engine speed. When the invention is being used to limit engine speed, at least a portion of the accelerator pedal movement does not result in a corresponding throttle lever displacement. Therefore, it is an object of this invention to provide a throttle linkage which selectively limits the throttle lever displacement for a given accelerator pedal lever displacement. It is a further object to provide engine speed control apparatus which is employed during preselected transmission positions.

A linkage constructed in accordance with this invention includes an actuating lever pivotally mounted on a fulcrum that is fixed, for example, to a vehicle body. A pulley is pivotally mounted on the lever for movement about an axis spaced from the pivot axis of the pedal. A flexible linkage interconnects the pulley and a controlled member such as a carburetor throttle lever. A spring biases the pulley toward a normal position. A latch means locks the pulley in its normal position relative to the lever. The latch means is releasable to permit the pulley to rotate relative to the lever when the moment on the pulley resulting from tension of the flexible linkage exceeds that of the spring.

BRIEF DESCRIPTION OF THE DRAWING

The drawing shows a side elevational view of a pedal assembly and throttle linkage constructed in accordance with this invention taken in the direction of the pedal pivot axis.

DETAILED DESCRIPTION OF A PREFERRED EMBODIMENT

The pedal assembly 11 is pivotally attached to a vehicle fire wall 12 by a fulcrum assembly 13. The pedal is attached to the fulcrum assembly by a pin 14. The assembly includes a lever member 16 having a pedal pad 17 attached to its lower end suitable for engagement with a vehicle operator's foot. A pulley 18 is pivotally attached to the upper end of the lever 16 by pin 19. The pulley is irregularly shaped and includes an enlarged grooved rim portion 21 that receives a cable 22. Opposite the grooved portion of the pulley is a minimum diameter portion 23 having a pair of generally radially directed edge portions 24 and 26. The edge portion 24 engages an abutment pin 27 which is secured to the lever. The edge 26 engages a latch in the form of a plunger or movable element 28 of a solenoid 29. The solenoid is secured to the lever 16. The movable element 28 of the solenoid together with the abutment pin 27 determine a fixed normal position for the pulley 18 relative to the lever. Between the minimum diameter portion 23 and the rim portion 21 of pulley 18 are intermediate sections 31 and 32 having radii greater than the minimum radius but less than the radius of the enlarged groove portion. A coiled tension spring 33 interconnects point 34 on pulley 18 and point 35 on the lever 16. The spring urges the edge 24 of the pulley toward a normal position of abutment with the pin 27. The point of attachment of the pulley to the spring 33 is spaced from the pivot axis of the pulley so that the spring force acts through a lever arm. A flexible cable 22 is received within the grooved rim 21 of the pulley and is attached to the pulley at point 36 so that when the pulley is in its normal position (as shown in the drawing) about 90° of the grooved rim portion 21 of the pulley engages cable 22. The cable extends from the pulley through an opening 37 in the fire wall and is connected to a controlled device 38 such as a throttle lever. The lever 38 is biased toward a closed position by a tension spring 39. Consequently, the cable is placed in tension and the pedal assembly is biased toward a raised, normal position.

When the solenoid 29 is not energized, the plunger element 28 is biased into a protracted position by a compression spring 41. The plunger element 28 then is received within the minimum diameter portion 23 between edges 24 and 26, as shown in the drawing, and the accelerator pedal 11 operates as conventional rigid pedal lever. When the solenoid 29 is energized, the plunger element 28 is retracted or unlatched no longer precluding clockwise rotation of pulley 18. The pedal assembly operates as a rigid lever until the moment on pulley 18 resulting from the tension force in the cable 22 exceeds the opposing moment on pulley 18 resulting from the force of the spring 33. When the invention is used to prevent transmission damage in a rotary or turbine engine powertrain, the moment acting on the pulley due to the spring 33 is somewhat greater than the moment acting on the pulley due to the throttle return spring 39 or cable tension. This permits a small degree of throttle opening movement for starting, but prevents high revving of the engine when the transmission is in neutral thereby preventing overspeed damage to the transmission. Spring 33 is positioned relative to the lever 16 and the pulley 18 so that the moment it exerts on the pulley 18 remains substantially even or constant despite the rotation of the pulley. It can be seen that as the tension force of the spring increases due to its increased elongation, the lever arm through which the spring acts decreases in length as the centerline of the spring 33 moves closer to the axis of the pulley 18. While the cable force always acts through a constant lever arm, the tension within the cable increases as the elongation of throttle return spring 39 increases. Consequently, when the plunger element 28 of the solenoid is retracted the pulley 18 is unlatched and partial depression of the accelerator pedal causes the tension imparted to the pulley by the cable and throttle return spring to exceed the opposing moment resulting from spring 33. Further depression of the accelerator pedal results in increased elongation of the spring 33 and lengthening of the throttle linkage so that the throttle lever 38 is actually displaced only a small fraction of the amount it would be if the pulley were latched.

Electrical circuit 47 includes a battery 46, an ignition switch 42, the solenoid 29 and a pair of switches 43 and 44 positioned in parallel. Switch 43 is closed when the transmission selector lever is placed in "park" and switch 44 is closed in "neutral". Thus, when the ignition switch 42 and one of the transmission selector switches 43 and 44 are closed the solenoid is energized and the speed control mechanism is operative. As a result, the throttle opening is limited to a predetermined magnitude under these conditions and possible damage from overrevving of the engine will be prevented.

The throttle linkage is not limited to the environment described above. For example, if the pulley 18 and latch 28 were encased and an appropriate circuit provided, the throttle linkage could form a part of a vehicle anti-theft system in which significant vehicle speeds could not be obtained until the speed control apparatus were disengaged. Other modifications and alterations will occur to those skilled in the art which are included within the scope of the following claims.

I claim:

1. A linkage for the operation of a remote element including:
   an actuating lever,
   a fulcrum means pivotally supporting said actuating lever for movement about a first axis,
   a pulley mounted on said lever for pivotal movement about a second axis spaced from said first axis,
   a flexible linkage means interconnecting said pulley and the remote element,
   spring means biasing said pulley toward a normal position,
   latch means locking the pulley in said normal position relative to said lever,
   said latch means being releaseable to permit said pulley to rotate relative to said lever when the tension of said flexible linkage exceeds that of said spring means.

2. A linkage according to claim 1,
   said flexible linkage means engaging at least a portion of the periphery of said pulley.

3. A linkage according to claim 1,
   an abutment mounted on said lever engageable with said pulley in its normal position.

4. A linkage according to claim 1,
   said spring means comprising a tension spring extending from said pulley to said lever.

5. A linkage according to claim 1,
   said spring means comprising a tension spring extending from said pulley to said lever, one end of said spring acting on said pulley at a point spaced a predetermined distance from the axis of said pulley, the lever arm of the spring force decreasing in length as the pulley rotates away from its normal position.

6. A throttle linkage interconnecting an accelerator pedal lever and a throttle lever,
   a fulcrum means pivotally supporting said pedal lever for movement about a first axis,
   a pulley pivotally mounted on said pedal lever for movement about a second axis spaced from said first axis,
   a flexible linkage means interconnecting said pulley and the throttle lever,
   spring means biasing said pulley toward a normal position,
   latch means to lock the pulley in said normal position,
   said latch means being releaseable to permit said pulley to rotate relative to said pedal lever when the moment on said pulley resulting from the tension of said flexible linkage exceeds opposing moment on said pulley resulting from said spring means.

7. A throttle linkage according to claim 6,
   said flexible linkage means including a cable, said cable engaging at least a portion of the periphery of said pulley.

8. A throttle linkage according to claim 6,
   a first abutment mounted on said pedal lever,
   a second abutment on said pulley,
   said spring means biasing said second abutment into engagement with said first abutment to define the normal position of said pulley.

9. A linkage according to claim 6,
   said spring means comprising a tension spring extending from said pulley to said lever.

10. A linkage according to claim 6,
    said spring means comprising a tension spring extending from said pulley to said pedal lever, one end of said spring acting on said pulley at a point spaced a predetermined distance from the axis of said pulley in its normal position, the lever arm of the spring force decreasing in length as the pulley rotates away from its normal position.

11. A throttle linkage according to claim 6,
    said latch means comprising a solenoid assembly including a movable element,
    a portion of said pulley being engageable with said movable element when said pulley is in its normal position,
    said movable element being retractable to permit said pulley to rotate relative to said pedal lever.

12. Engine speed control apparatus comprising the throttle linkage according to claim 11,
    a circuit including a source of electrical current, said solenoid and a switch,
    said switch being closed and the movable element of said solenoid retracted when the speed of the engine is to be controlled.

13. Engine speed control apparatus according to claim 6,
    second spring means biasing said throttle lever toward a closed position and said accelerator lever toward a normal position,
    said second spring means placing said flexible linkage means in tension.

* * * * *